(12) United States Patent
Lesi et al.

(10) Patent No.: US 12,148,061 B2
(45) Date of Patent: Nov. 19, 2024

(54) MALICIOUS REQUEST DETECTION IN AUTOMATED RESOURCE DISPATCH

(71) Applicant: Intel Corporation, Santa Clara, CA (US)

(72) Inventors: Vuk Lesi, Cornelius, OR (US); Qian Wang, Santa Clara, CA (US); Christopher Gutierrez, Hillsboro, OR (US); Marcio Rogerio Juliato, Portland, OR (US); Shabbir Ahmed, Beaverton, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 17/133,076

(22) Filed: Dec. 23, 2020

(65) Prior Publication Data
US 2021/0120021 A1   Apr. 22, 2021

(51) Int. Cl.
*G06Q 50/47*   (2024.01)
(52) U.S. Cl.
CPC .................... *G06Q 50/47* (2024.01)
(58) Field of Classification Search
CPC ............................................ G06Q 50/47
USPC ........................................................... 705/13
See application file for complete search history.

(56) References Cited

U.S. PATENT DOCUMENTS 10,805,402 B1 * 10/2020 Whitman ............ H04W 12/104

FOREIGN PATENT DOCUMENTS

| CN | 104866953 | 8/2015 |
|---|---|---|
| CN | 107122866 | 9/2017 |
| CN | 107480798 | 12/2017 |
| KR | 20110037605 | 4/2011 |

OTHER PUBLICATIONS

"Detection of malicious vehicles (DMV) through monitoring in Vehicular Ad-Hoc Networks" Published by Springer Link (Year: 2011).*
"United Kingdom Application Serial No. 2116871.1, Response filed Dec. 23, 2022 to Combined Search and Examination Report mailed May 24, 2022", 6 pgs.
"United Kingdom Application Serial No. 2116871.1, Response filed Aug. 7, 2023 to Subsequent Examination Report mailed Jun. 8, 2023", 8 pgs.
"United Application Serial No. 2116871.1, First Examination Report Under Section 18(3) mailed Oct. 11, 2023", 6 pgs.

(Continued)

*Primary Examiner* — Zeina Elchanti
(74) *Attorney, Agent, or Firm* — Schwegman Lundberg & Woessner, P.A.

(57) ABSTRACT

Systems and techniques for malicious request detection in automated resource dispatch are described herein. A request for a resource may be received from a user device. A location may be obtained for delivery of the resource. Sensor data may be retrieved for the location. The sensor data and user profile data may be evaluated to determine if the request is malicious. A disincentivizing message may be generated based on the determination that the request is malicious. In response to receipt of a response to the disincentivizing message, a resource may be dispatched to the location.

24 Claims, 7 Drawing Sheets

(56) References Cited

OTHER PUBLICATIONS

"United Kingdom Serial No. 2116871.1, Response Filed Nov. 17, 2023 to First Examination Report Under Section 18(3) mailed Oct. 11, 2023", 11 pgs.
"United Kingdom Application Serial No. 2116871.1, Combined Search and Examination Report mailed May 24, 2022", 10 pgs.
"United Kingdom Application Serial No. 2116871.1, Subsequent Examination Report mailed Jun. 8, 2023", 4 pgs.

* cited by examiner

MALICIOUS REQUEST DETECTION IN AUTOMATED RESOURCE DISPATCH

TECHNICAL FIELD

Embodiments described herein generally relate to automated resource dispatch and, in some embodiments, more specifically to malicious request detection and remediation in automated resource dispatch.

BACKGROUND

A user may request a resource (e.g., a robotaxi, etc.) using a computing device (e.g., a mobile device, etc.). The resource may be dispatched to the location of the user. There may be several resource providers with resources near the location of the user that may be dispatched. Malicious requests may be received that would divert resources from the vicinity of the user, leaving one or no providers with resources to fulfil the request of the user.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and techniques discussed herein provide a solution for detection of large-scale resource (e.g., robotaxi, etc.) malicious requests. A mobility-as-a-service (MaaS) dispatcher is responsible for connecting users with a resource. However, there is potential for abuse. An attacker may request a resource and later cancel the request-which may incur a fee. At a large scale, an attacker may influence a fleet to move away from an area with high demand causing a loss of revenue for a MaaS company. A targeted campaign against a company could be devastating. The attacker may make requests even if they are not physically near the location of service delivery which may be challenging.

Existing approaches for mitigating malicious requests may rely on a location (e.g., GPS receiver data) of the user or user account history (e.g., more careful with new users, users with a ride cancellation history, require a static fee if canceled after some time, etc.). However, a client device of an attacker may spoof global positioning system (GPS) location making it difficult to determine whether the request is valid. In addition, account history may not provide enough information to detect malicious requests as accounts may be compromised and under the control of an attacker. An attacker may create several accounts, pay for some valid requests, and later issue malicious requests.

Because the location of the requestor may be spoofed, and user accounts may be compromised or created ahead of time with the intention to mount an attack, a hierarchical verification scheme is used that involves multiple physical factors that may generate a digital certificate attesting to the presence of a requestor in a certain location. Sources such as recent sensing records and live data from a fleet of resource delivery vehicles are utilized to make the verification process resilient. A dynamic de-incentivization policy is employed that considers mobile eyewitnesses (e.g., resource delivery vehicles, points near the location, drones, etc.) whose sensors (cameras, microphones, proximity sensors, etc.) may provide situational awareness at and near the target location. For an attacker to attempt a malicious request, the attacker must be physically present in the environment and must provide evidence of proximity to several sensors near the request location. This is an advantage over the existing solutions where an attacker can be remote and provides resilience to fleet-level exploits. The benefits of the solution include reduced fleet redirection and routing due to malicious requests resulting in a decrease in computational resources and roadway utilization, increased service availability, and a potential decrease in hardware required based on a reduction in fleet capacity to accommodate for malicious requests.

Figure 1:
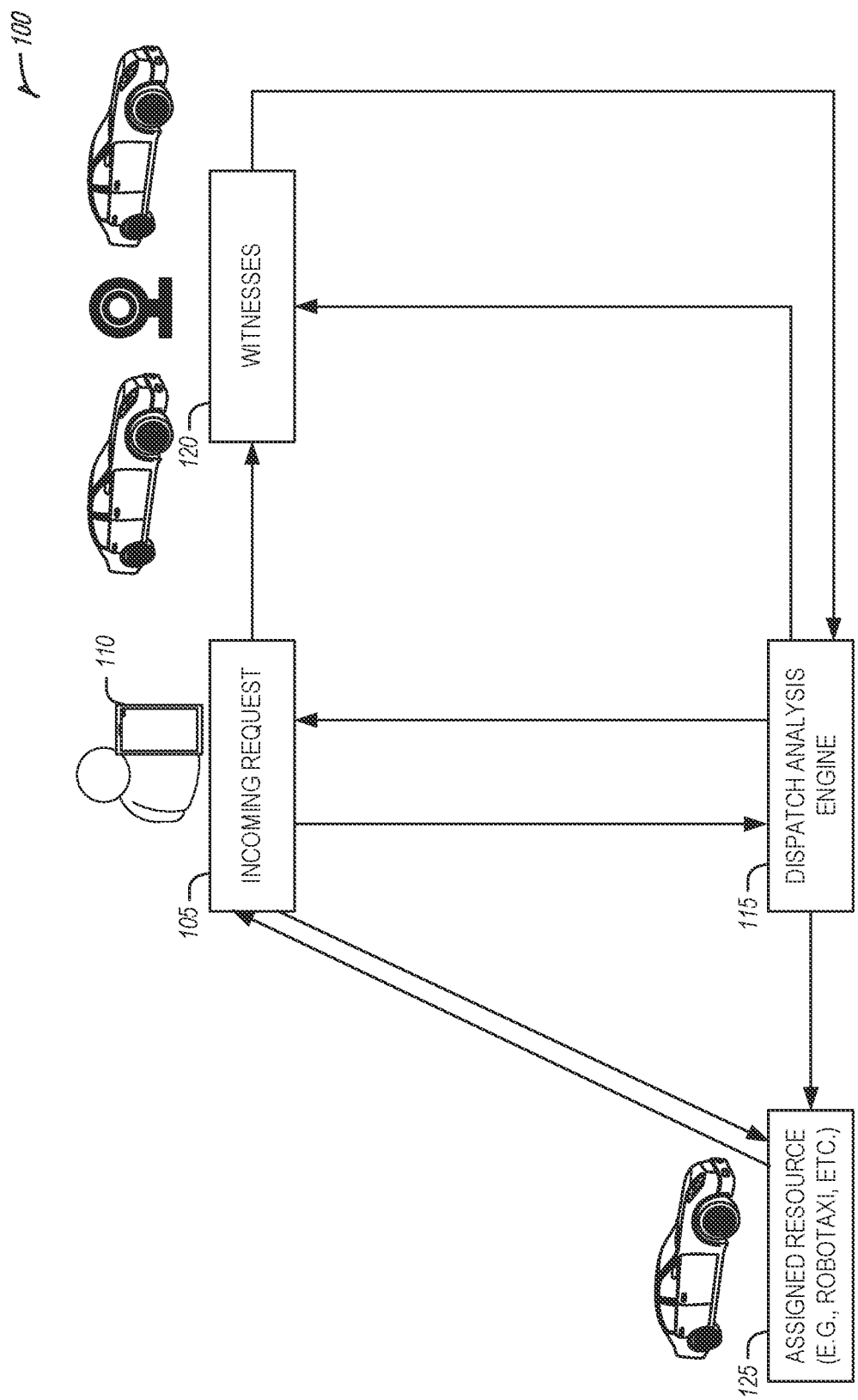
FIG. 1 is a block diagram of an example of an environment for malicious request detection in automated resource dispatch, according to an embodiment.

FIG. 1 is a block diagram of an example of an environment 100 for malicious request detection in automated resource dispatch, according to an embodiment. The environment 100 includes an incoming request 105 submitted via a user device 110, a dispatch analysis engine 115, witnesses 120, and an assigned resource 125.

When a user makes the request 105, the dispatch analysis engine 115 determines a disincentivizing policy. The dispatch analysis engine 115 determines if the request 105 is malicious by analyzing a directed graph that represents resources (e.g., robotaxis, etc.) near a location requested by the user. If it appears that resources are moving away from the given area, a disincentivizing prompt is issued to the user device 110 (e.g., an increase in the cancelation fee, etc.). Further, the dispatch analysis engine 115 uses other resource delivery vehicles or infrastructure (e.g., cameras with a view of the location, drone sensors, etc.) to be witnesses 120 of the request 105. A witness 120 (e.g., a robotaxi, etc.) that is near the claimed location of the user observes for wireless tokens indicating that the user is near the location they claim to be at. Likewise, the assigned resource 125 may observe the user as the user approaches the location. The disincentivizing_polices are analyzed and enforced by the dispatch analysis engine 115 and the witnesses 120 are collected in the environment. The disincentivizing_prompt may adjust the cancelation fee as more evidence of the validity of the request 105 is collected. Each of the steps in the verification process is organized in layers where the disincentives are adjusted based on evidence that the user is physically near the requested resource delivery location. Each layer includes a certificate of authenticity to verify the witnesses and claims.

Figure 2:
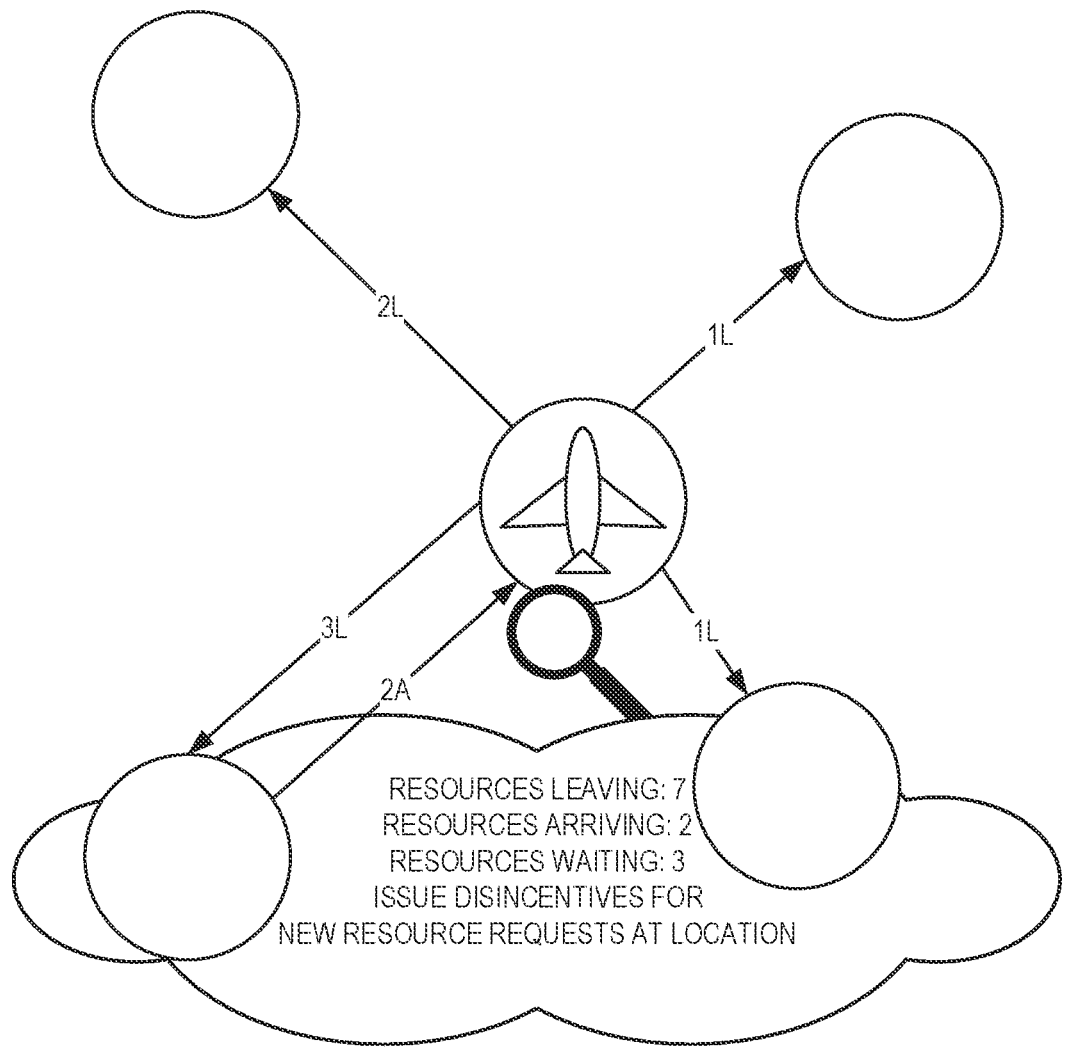
FIG. 2 illustrates an example of a service flow directed graph for malicious request detection in automated resource dispatch, according to an embodiment.

FIG. 2 illustrates an example of a service flow directed graph 200 for malicious request detection in automated resource dispatch, according to an embodiment. FIG. 2 may provide features as described in FIG. 1.

A dispatch analysis engine (e.g., dispatch analysis engine 115 as described in FIG. 1, etc.) constructs a directed graph where each edge of the graph represents a road segment and each node is a junction (e.g., a road intersection, etc.) where a vehicle crosses into a different road segment. The weights of the graph represent the resource that is currently transiting a given road segment: label A denotes vehicles arriving and label L for vehicles leaving. This directed graph is a Service Flow Directed Graph (SFDG) as illustrated in FIG. 2. For a key location, the SFDG keeps track of resources that are on stand-by and waiting for user requests (e.g., robotaxis in a taxi lot at an airport, etc.). The graph is kept up to date in real time based on the location of the resources in the area as the travel to and from the key location of interest and the expected rate of request for the resource. If at any point the rate of which the resources are leaving the key location is greater than the sum of the rate of resources entering the area, the resources on stand-by, and the number of expected requests, a disincentivizing notice is issued to the existing (or new) users requesting a resource. The disincentivizing_amount is dependent on where the user request is located within the hierarchical verification scheme and how much demand is leaving the area.

Figure 3:
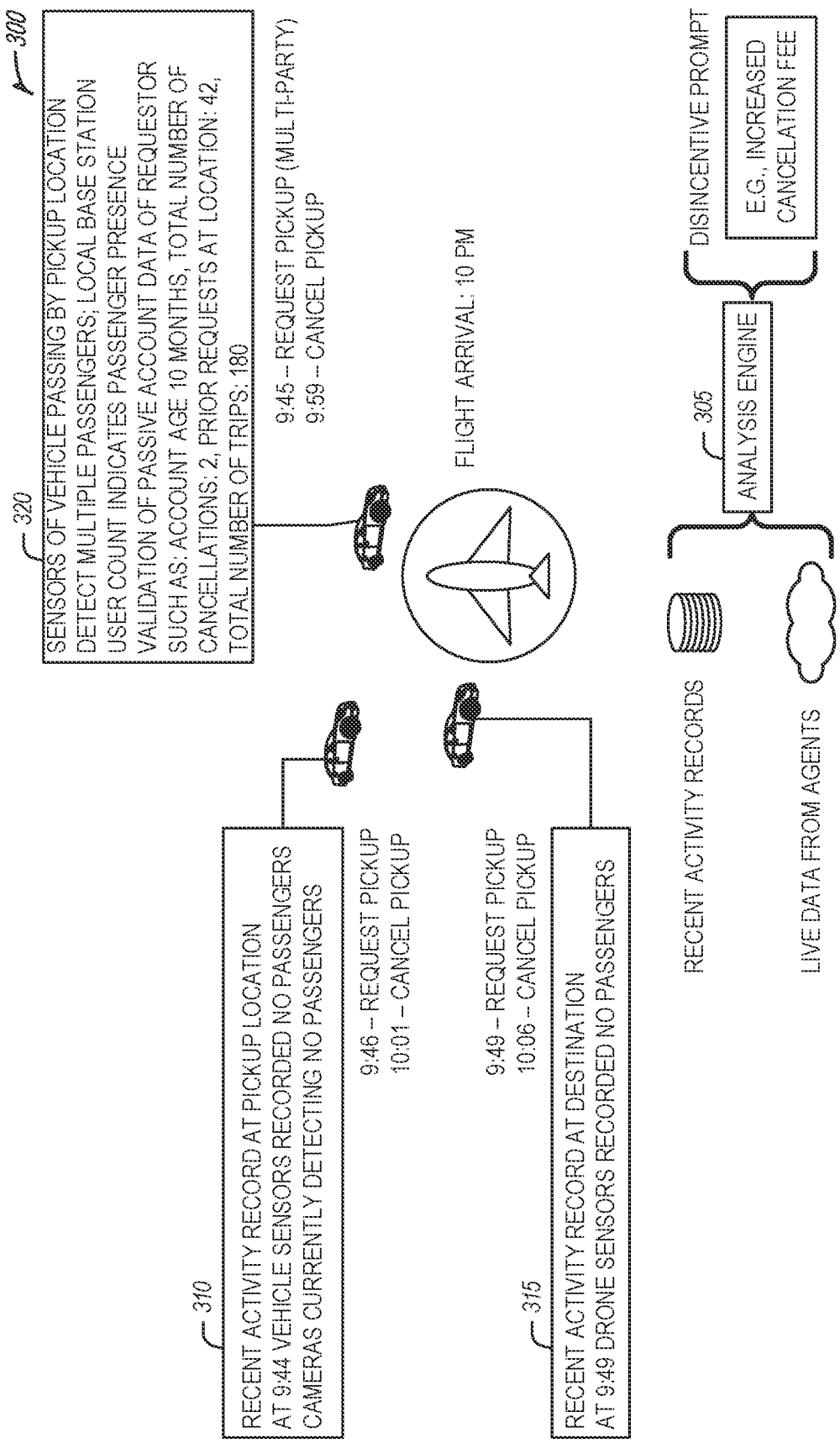
FIG. 3 illustrates an example of a large-scale malicious request according to an embodiment.

FIG. 3 illustrates an example of a large-scale malicious request 300 according to an embodiment. FIG. 3 may provide features as described in FIGS. 1 and 2.

In FIG. 3, requests are maliciously generated to divert vehicles of a target fleet away from an airport at a given time when a flight is expected to land. The SFDG indicates that the rate that resources are leaving the airport area is high so a disincentivizing prompt will be issued to users making, and having made, a resource request.

The dispatch analysis engine 305 may detect that a first request 310 and a second request 315 are suspicious given the recent activity records from agents near the respective resource delivery locations. Therefore, the dispatch analysis engine 305 will proceed with caution (e.g., issue a disincentivizing prompt to discourage cancellation, etc.). On the other hand, a third request 320 may be characterized as non-malicious as there is enough environmental information at the resource delivery location to confirm a multi-party ride request. The additional sensing data may be used to validate that a user account is (is still) trusted (e.g., issues non-malicious ride requests, etc.). Data that may be utilized in validating the user account, by way of example and not limitation, includes: perception of other fleet vehicles (while privacy of human actors is preserved), perception of aerial agents (while privacy of human actors is preserved), crowd-sourced data (e.g., information on business, etc.), wireless network (e.g. 4G/5G) utilization data, roadside unit (RSU) information, other infrastructure-based data, etc.

Figure 4:
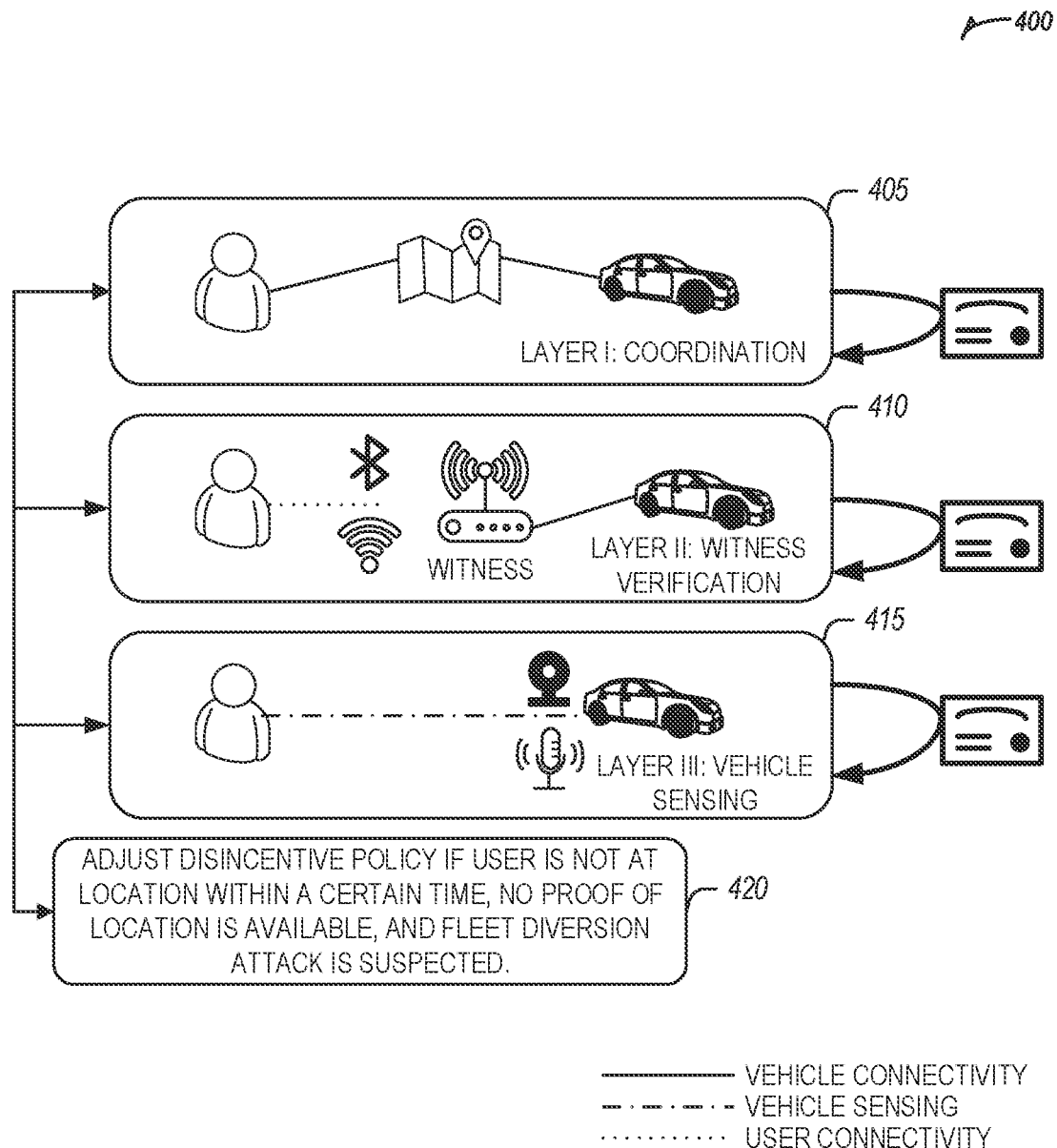
FIG. 4 illustrates an example of a hierarchical verification scheme for malicious request detection in automated resource dispatch, according to an embodiment.

FIG. 4 illustrates an example of a hierarchical verification scheme 400 for malicious request detection in automated resource dispatch, according to an embodiment. FIG. 4 may provide features as described in FIGS. 1 to 3.

A dispatching analysis engine 420 may utilize additional sensing information from nearby agents as they become available while executing the hierarchical verification scheme. The hierarchical verification scheme includes 3 layers: a coordination layer 405, a witness verification layer 410, and a vehicle sensing layer 415.

At the coordination layer 405, a user provides the geographical coordinates to request a resource. The dispatching analysis engine 420 verifies the rationality of the resource delivery location from a map using an analysis engine. Accordingly, a disincentivizing prompt may be displayed to the user. The dispatching analysis engine 420 shares the resource delivery location and the live GPS location of the user with the assigned resource that will deliver the resource to the user. The dispatching analysis engine 420 prepares witnesses (e.g., robotaxis, internet of things (IoT) cameras, networking nodes, etc.) that are near the user and requested resource delivery location for verifying proof-of-location. If the location is unverifiable (e.g., crowded, etc.) the user may be prompted to go to a new resource delivery location and the previous verification steps may be completed. A certificate is allocated for this layer that is handed over to the next layer.

At the witness verification layer 410, witness verification is facilitated through wireless communication. The user broadcasts proof-of-location to resources in the environment via wireless communication (e.g., Bluetooth, Wi-Fi, cellular, etc.). Witnesses receive the broadcast token and verify the location of the user. Witnesses send location certificates to the dispatching analysis engine 420. The dispatching analysis engine 420 then notifies an assigned resource that the user is physically present at the claimed resource delivery location. In an example, if no witnesses are available or the witnesses cannot verify the user, a disincentivizing prompt is displayed to the user. In another example, the user may be asked to recomplete the coordination step to increase the availability of witnesses to verify the resource delivery location. A certificate is allocated for this layer and is handed over to the next layer.

At the vehicle sensing layer 415, the user connects to the assigned resource through on-vehicle sensible channels (e.g., gestures, multimedia displayed on a user's device, biometrics, etc.). The assigned resource verifies the user by using vehicle sensors such as cameras. LiDAR, Radar, etc. If the user decides to cancel at this point, the dispatching analysis engine 420 takes note of the incident. The cancelation at this step may be valid as the user has been physically verified. The penalty for cancelation may be adjusted accordingly (e.g., reduced from the originally requested fee to the standard cancellation rate upon verification, etc.). The assigned resource re-verifies the certificates and allows resource access to the user.

An attack that compromises one layer would not be successful. The attacker must be physically present for any fraudulent requests to be attempted. Mountable attacks in respective layers may include:

Using false location in the map at the coordination layer 405. No effort is needed from the attacker. The attacker simply selects the location where they wish to call for a resource.

Falsified GPS location at the coordination layer 405. The attacker effort may be low for spoofing a location from their device to the MaaS. A rooted mobile Operating System may arbitrarily report any GPS location at the discretion of the attacker.

Fraudulent location via short-range communications at witness verification layer 410. The effort for the attacker is high. The attacker must be physically (or have control of a device) near a location where they requested a resource. Further, the attacker must spoof the communications with all the witnesses at that location.

Spoofing all the sensors on the resource delivery vehicle simultaneously at the vehicle sensing layer 415. Spoofing the sensors onboard a resource delivery vehicle is quite challenging and requires an attacker to be physically present.

The handover of certificates ensures the verification consistency among layers. In the vehicle sensing layer 415, multiple active sensing methods are used to prove the location of the user. Indicators such as received signal strength, angle of arrival, and time of flight in wireless environment are used in proving the location of the user. Additional indicators such as pictures on the screen captured by the camera, gestures sensed by camera and radar, and sound played by a phone of the user may be used in proving the location of the user.

In a large-scale attack the dispatching analysis engine 420 uses the hierarchical scheme to verify a single request. By agreeing to the disincentivizing policy, the user would expect the penalty for cancelation and records of abuse on the user profile. When a large-scale malicious request is initiated, the analysis engine in the dispatching analysis engine 420 will verify each request based on the hierarchical verification scheme. The dispatching analysis engine 420 would charge the malicious requestors a penalty and degrade the reputation of their accounts. The analysis would determine if the requests are malicious by analyzing the SFDG. The systems and techniques discussed herein are applicable to malicious request patterns aiming at diverting a fleet from a profitable area and fleet convergence around a specific area to cause congestion.

The dispatching analysis engine 420 provides hand-off between layers. Connected resources and users enroll into a certificate management system to obtain security certificates from a certificate authority (CA) and attach those certificates to their messages as part of a digital signature when transferring between the hierarchical levels. The functionality of the CA in the dispatching analysis engine 420 is to create, distribute, and revoke certificates. The CA will form a chain of trust that follows a hierarchy so that the signature on a certificate along the chain is validated from the root and then climbs up a link of the chain. This concept is called chain-validation of certificates and is the fundamental concept of a public key infrastructure (PKI) system.

Figure 5:
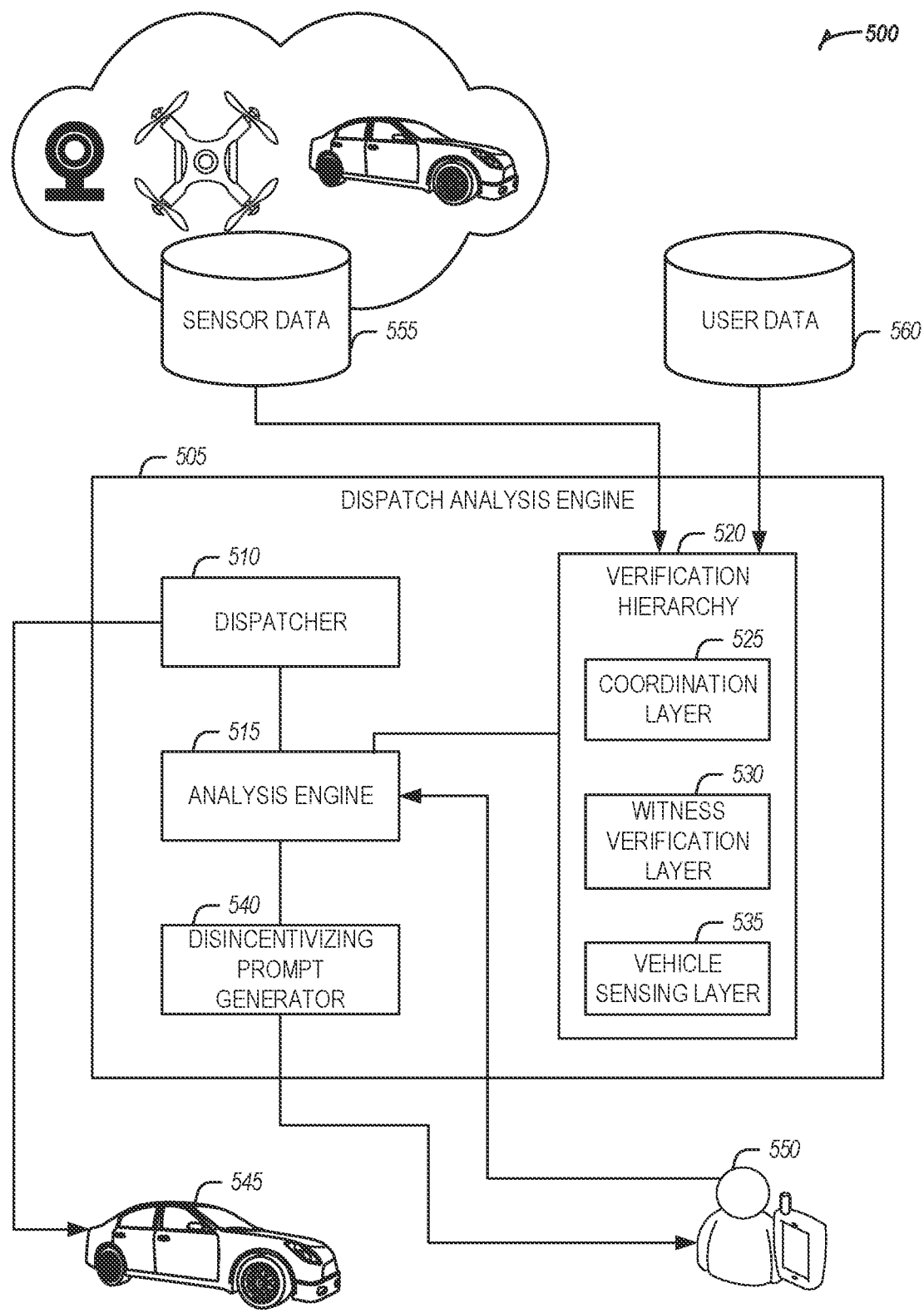
FIG. 5 is a block diagram of an example of an environment and system for malicious request detection in automated resource dispatch, according to an embodiment.

FIG. 5 is a block diagram of an example of an environment 500 and system 505 for malicious request detection in automated resource dispatch, according to an embodiment. FIG. 5 may provide features as described in FIGS. 1 to 4.

The environment 500 may include a user 550 that is requesting a resource, a resource delivery vehicle 545 that may deliver resources (e.g., services, goods, etc.) to the user 550, sensor data 555 that may include observed data about a location that the user 550 has specified for delivery of the resource, user data 560 that may include account details of the user 550, and the system 505. In an example, the system may be a dispatch analysis engine. The system 505 may include a variety of components including a dispatcher 510 that dispatches vehicles to deliver resources such as resource delivery vehicle 545, an analysis engine 515 that may evaluate sensor data and user profile data using a verification hierarchy 520 to determine if a request for a resource is malicious, and a disincentivizing prompt generator 540 that may generate disincentives for presentation to the user 550 based on a determination that the request may be malicious.

The system 505 may receive a request for a resource from a user device of the user 550. In an example, the request may be received from a mobile device of the user 550. A location may be obtained for delivery of the resource. In an example, the location may be obtained from a global positioning system (GPS) sensor of the mobile device of the user 550.

Sensor data 555 may be retrieved for the location. The sensor data and user profile data may be evaluated by the analysis engine 515 to determine that the request is malicious. In an example, the sensor data for the location may include camera data from a camera sensor observing the location. In another example, wherein the sensor data for the location may include sensor data from an autonomous vehicle in the vicinity of the location. In yet another example, the sensor data for the location may include sensor data from a drone observing the location. In an example, the verification hierarchy 520 may be applied to the sensor data and the user profile data to determine that the user is not at the location.

In an example, the verification hierarchy 520 may include a coordination layer 525, a witness verification layer 530, and a vehicle sensing layer 535. The coordination layer 525 may evaluate validity of the location and may generate a certificate for handoff to another layer of the verification hierarchy 520. The witness verification layer 530 may identify witnesses with sensors that observe the location. The witness verification layer 530 may evaluate data from the sensors to determine if the user 550 is at the location and may generate a certificate for handoff to another layer of the verification hierarchy 520. The vehicle sensing layer 535 may evaluate sensor data from resource delivery vehicle 545 delivering the resource to determine if the user 550 is at the location and may generate a certificate for handoff to another layer of the verification hierarchy 520.

In an example, when the sensor data 555 and the user profile data 560 is evaluated using the verification hierarchy 520, a failure at one layer may cause a remediation prompt to be transmitted to the user. The remediation prompt may ask the user to move to a new location, provide additional data, etc. The analysis engine 515 may return to layers of the verification hierarchy 520 to reevaluate the new data and may progress again through the layers of the verification hierarchy as certificates are generated to be handed off among the levels. In an example, the evaluation at each layer may proceed independently of the other layers and the analysis engine 515 may evaluate the outputs from each layer as certificates are generated to decide regarding the validity of a request.

In an example, evaluation of the sensor data and the user profile data to determine that the request is malicious may include evaluation of a service flow directed graph to evaluate resource movement near the location. In an example, the service flow directed graph may include a map of resource routes and resource delivery vehicle movement throughout the map. In an example, if abnormal resource flow is detected (e.g., more resource moving from a key location than to a key location, etc.) based on incoming requests, the requests may be determined to be a large-scale malicious request attack. Thus, movement velocity of resource delivery vehicles within the service flow directed graph may be evaluated to detect anomalies that may indicate incoming malicious requests.

The disincentivizing prompt_generator 540 may generate a disincentivizing message based on the determination that the request is malicious. For example, a prompt may be transmitted to the device of the user 550 indicating that the cancellation fee has increased for the requested resource and may be asked to accept or cancel the resource request.

In response to receipt of a response to the disincentivizing message, the dispatcher may dispatch a resource to the location. For example, the user 550 may accept the increased cancellation fee and the resource delivery will continue to be dispatched to the location indicated by the user. In another example, a prompt may be sent to the device of the user 550 requesting that the user move to an alternate delivery location. The response may be an acknowledgement by the user 550 or detection of GPS data from the device of the user 550 indicating the user 550 has moved to the alternate delivery location. In an example, the alternate delivery location may be under observation by witness sensors that may verify the presence of the user 550 at the location.

Figure 6:
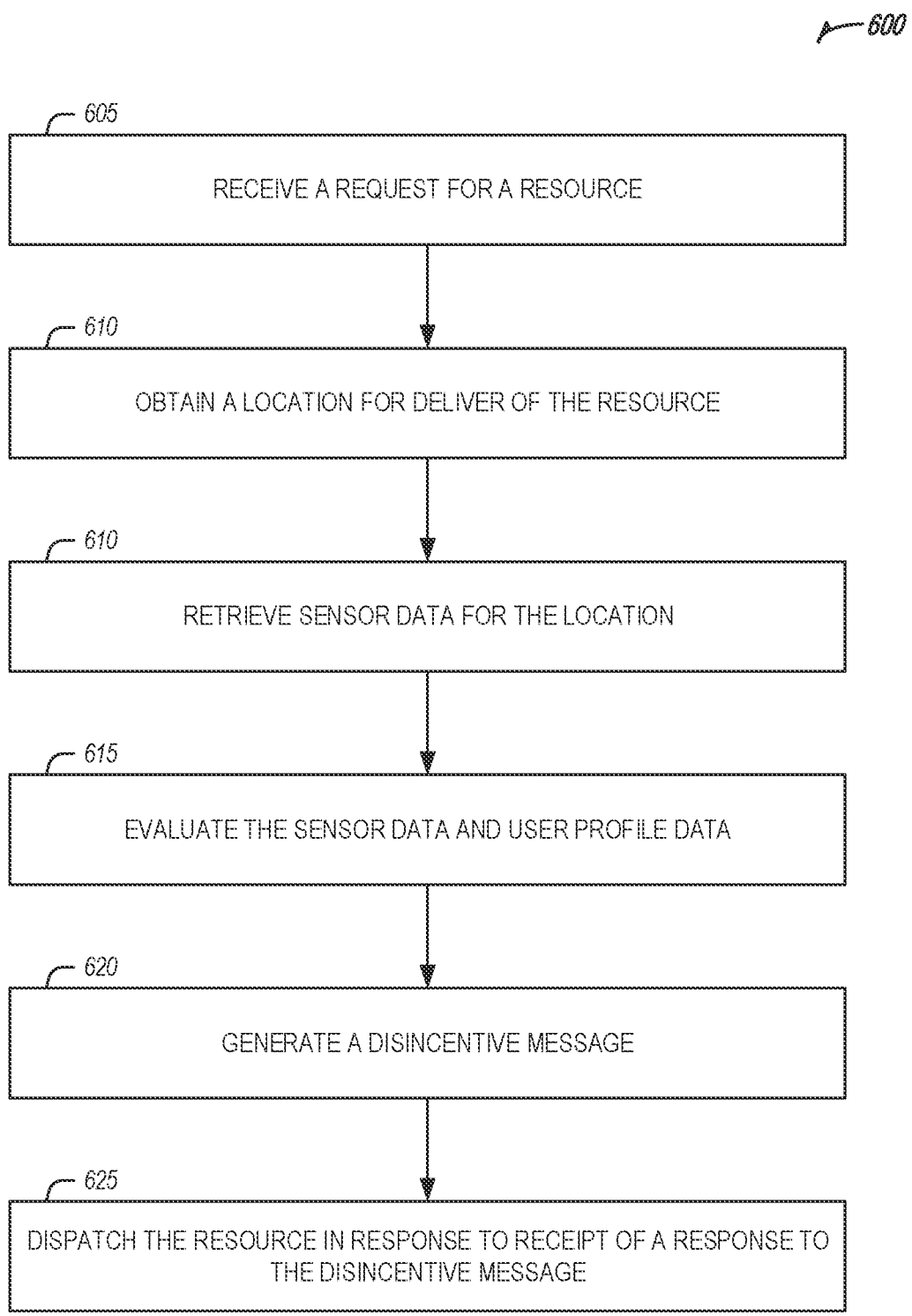
FIG. 6 is a flow diagram of an example of a method for malicious request detection in automated resource dispatch, according to an embodiment.

FIG. 6 is a flow diagram of an example of a method 600 for malicious request detection in automated resource dispatch, according to an embodiment. The method 600 may provide features as described in FIGS. 1 to 5.

At operation 605, a request for a resource may be received from a user device. In an example, the request may be received from a mobile device of a user.

At operation 610, a location may be obtained for delivery of the resource. In an example, the location may be obtained from a global positioning system (GPS) sensor of a mobile device of the user.

At operation 615, sensor data may be retrieved for the location. In an example, the sensor data for the location may include camera data from a camera sensor observing the location. In another example, the sensor data for the location may include sensor data from an autonomous vehicle in the vicinity of the location. In yet another example, the sensor data for the location may include sensor data from a drone observing the location. In another example, the sensor data may be from a network node such as a 4G, 5G, or WiFi access point. In yet another example, crowdsourced sensing data may be retrieved from users in the vicinity that may observe the user including data from internet of things (IoT) devices.

At operation 620, the sensor data and user profile data may be evaluated to determine that the request is malicious. In an example, a verification hierarchy may be applied to the sensor data and the user profile data to determine that the user is not at the location. In an example, the verification hierarchy may include a coordination layer, a witness verification layer, and a vehicle sensing layer. In an example, the coordination layer may evaluate validity of the location and may generate a certificate for handoff to another layer of the verification hierarchy. In an example, the witness verification layer may identify witnesses with sensors that observe the location, may evaluate data from the sensors to determine if the user is at the location, and may generate a certificate for handoff to another layer of the verification hierarchy. In an example, the vehicle sensing layer may evaluate sensor data from a dispatched vehicle delivering the resource to determine if the user is at the location and may generate a certificate for handoff to another layer of the verification hierarchy.

In an example, a service flow directed graph evaluated to determine resource movement near the location. In an example, the service flow directed graph may include a map of resource routes and resource delivery vehicle movement throughout the map.

At operation 625, a disincentivizing message may be generated based on the determination that the request is malicious. At operation 630, in response to receipt of a response to the disincentivizing message, a resource may be dispatched to the location.

Figure 7:
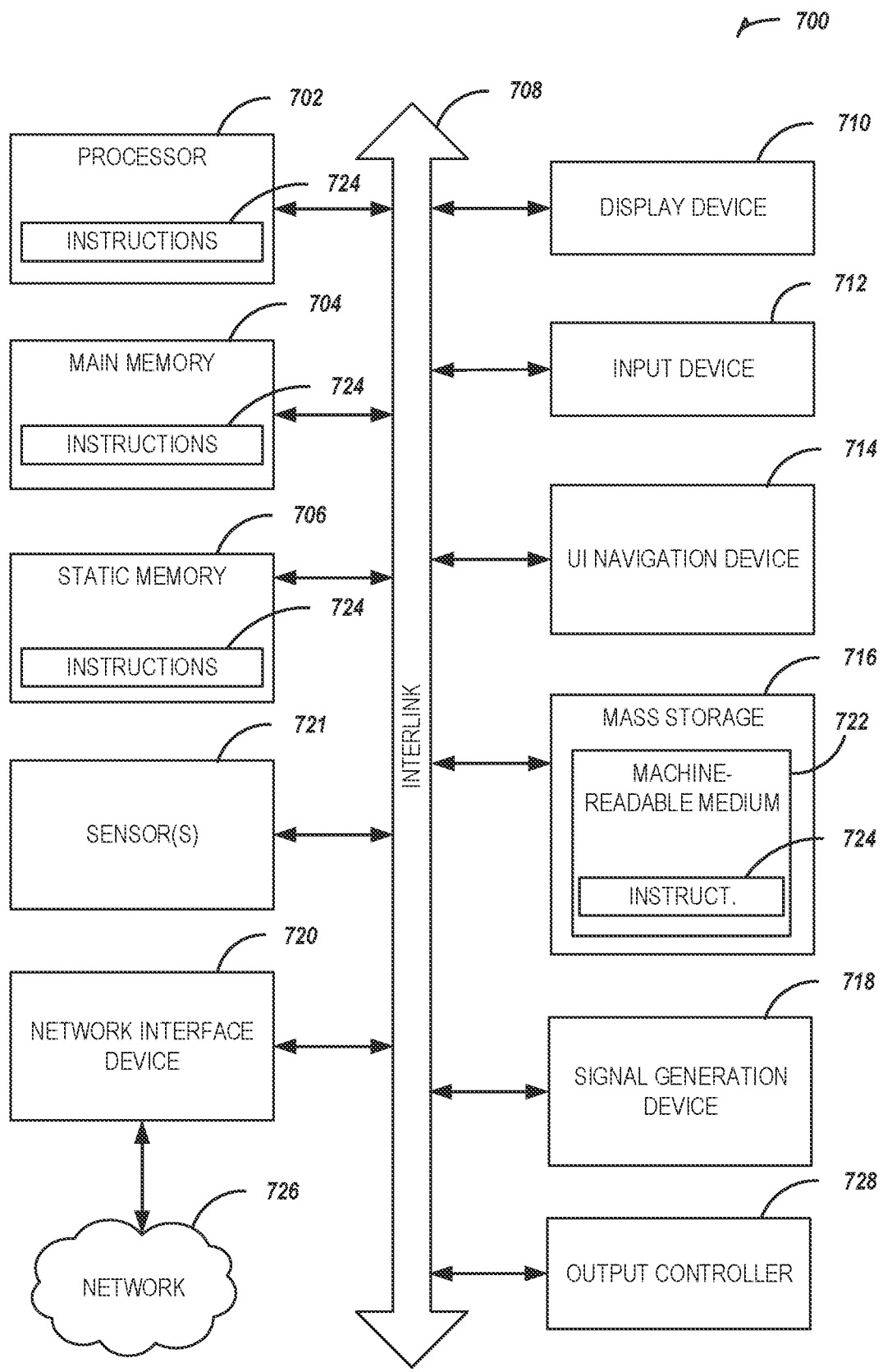
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensors. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa/LoRaWAN low power wide-area network (LPWAN) standards etc.). IEEE 802.15.4 family of standards, peer-to-peer (P2P) networks, satellite communication networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 is a system for malicious request deterrence in automated mobility resource dispatch comprising: at least one processor; and memory including instructions that, when executed by the at least one processor, cause the at least one processor to perform operations to: receive a request for a mobility resource from a user device; obtain a location for delivery of the mobility resource; retrieve sensor data for the location; evaluate the sensor data and user profile data to determine if the request is malicious; generate a disincentivizing message based on the determination that the request is malicious: and in response to receipt of a response to the disincentivizing message, dispatch the mobility resource to the location.

In Example 2, the subject matter of Example 1 wherein, the request is received from a mobile device of a user.

In Example 3, the subject matter of Examples 1-2 wherein, the location is obtained from a global positioning system sensor of a mobile device of a user.

In Example 4, the subject matter of Examples 1-3 wherein, the sensor data for the location includes camera data from a camera sensor observing the location.

In Example 5, the subject matter of Examples 1-4 wherein, the sensor data for the location includes sensor data from an autonomous vehicle in the vicinity of the location.

In Example 6, the subject matter of Examples 1-5 wherein, the sensor data for the location includes sensor data from a drone observing the location.

In Example 7, the subject matter of Examples 1-6 includes, the instructions to evaluate the sensor data and the user profile data further comprising instructions that, when executed by the at least one processor, cause the at least one processor to perform operations to: apply verification hierarchy to the sensor data and the user profile data to determine that a user of the user device is not located at the location.

In Example 8, the subject matter of Example 7 wherein, the verification hierarchy includes a coordination layer, a witness verification layer, and a vehicle sensing layer.

In Example 9, the subject matter of Example 8 wherein, the coordination layer evaluates validity of the location and generates a certificate for handoff to another layer of the verification hierarchy.

In Example 10, the subject matter of Examples 8-9 wherein, the witness verification layer identifies witnesses with sensors that observe the location, evaluates data from the sensors to determine if the user is located at the location, and generates a certificate for handoff to another layer of the verification hierarchy.

In Example 11, the subject matter of Examples 8-10 wherein, the vehicle sensing layer evaluates sensor data from a dispatched vehicle delivering the mobility resource to determine if the user is located at the location and generates a certificate for handoff to another layer of the verification hierarchy.

In Example 12, the subject matter of Examples 1-11 wherein, the instructions to evaluate the sensor data and user profile data to determine that the request is malicious further comprises instructions that, when executed by the at least one processor, cause the at least one processor to perform operations to evaluate a service flow directed graph to determine mobility resource movement near the location.

In Example 13, the subject matter of Example 12 wherein, the service flow directed graph includes a map of mobility resource routes and mobility resource delivery vehicle movement throughout the map.

Example 14 is at least one non-transitory machine-readable medium including instructions for malicious request deterrence in automated mobility resource dispatch that, when executed by at least one processor, cause the at least one processor to perform operations to: receive a request for a mobility resource from a user device; obtain a location for delivery of the mobility resource; retrieve sensor data for the location; evaluate the sensor data and user profile data to determine if the request is malicious; generate a disincentivizing message based on the determination that the request is malicious; and in response to receipt of a response to the disincentivizing message, dispatch the mobility resource to the location.

In Example 15, the subject matter of Example 14 wherein, the request is received from a mobile device of a user.

In Example 16, the subject matter of Examples 14-15 wherein, the location is obtained from a global positioning system sensor of a mobile device of a user.

In Example 17, the subject matter of Examples 14-16 wherein, the sensor data for the location includes camera data from a camera sensor observing the location.

In Example 18, the subject matter of Examples 14-17 wherein, the sensor data for the location includes sensor data from an autonomous vehicle in the vicinity of the location.

In Example 19, the subject matter of Examples 14-18 wherein, the sensor data for the location includes sensor data from a drone observing the location.

In Example 20, the subject matter of Examples 14-19 includes, the instructions to evaluate the sensor data and the user profile data further comprising instructions that, when executed by the at least one processor, cause the at least one processor to perform operations to: apply verification hierarchy to the sensor data and the user profile data to determine that a user of the user device is not located at the location.

In Example 21, the subject matter of Example 20 wherein, the verification hierarchy includes a coordination layer, a witness verification layer, and a vehicle sensing layer.

In Example 22, the subject matter of Example 21 wherein, the coordination layer evaluates validity of the location and generates a certificate for handoff to another layer of the verification hierarchy.

In Example 23, the subject matter of Examples 21-22 wherein, the witness verification layer identifies witnesses with sensors that observe the location, evaluates data from the sensors to determine if the user is located at the location, and generates a certificate for handoff to another layer of the verification hierarchy.

In Example 24, the subject matter of Examples 21-23 wherein, the vehicle sensing layer evaluates sensor data from a dispatched vehicle delivering the mobility resource to determine if the user is located at the location and generates a certificate for handoff to another layer of the verification hierarchy.

In Example 25, the subject matter of Examples 14-24 wherein, the instructions to evaluate the sensor data and user profile data to determine that the request is malicious further comprises instructions that, when executed by the at least one processor, cause the at least one processor to perform operations to evaluate a service flow directed graph to determine mobility resource movement near the location.

In Example 26, the subject matter of Example 25 wherein, the service flow directed graph includes a map of mobility resource routes and mobility resource delivery vehicle movement throughout the map.

Example 27 is a method for malicious request deterrence in automated mobility resource dispatch comprising: receiving a request for a mobility resource from a user device; obtaining a location for delivery of the mobility resource; retrieving sensor data for the location; evaluating the sensor data and user profile data to determine if the request is malicious; generating a disincentivizing message based on the determination that the request is malicious; and in response to receipt of a response to the disincentivizing message, dispatching the mobility resource to the location.

In Example 28, the subject matter of Example 27 wherein, the request is received from a mobile device of a user.

In Example 29, the subject matter of Examples 27-28 wherein, the location is obtained from a global positioning system sensor of a mobile device of a user.

In Example 30, the subject matter of Examples 27-29 wherein, the sensor data for the location includes camera data from a camera sensor observing the location.

In Example 31, the subject matter of Examples 27-30 wherein, the sensor data for the location includes sensor data from an autonomous vehicle in the vicinity of the location.

In Example 32, the subject matter of Examples 27-31 wherein, the sensor data for the location includes sensor data from a drone observing the location.

In Example 33, the subject matter of Examples 27-32 includes, evaluating the sensor data and the user profile data further comprising: applying verification hierarchy to the sensor data and the user profile data to determine that a user of the user device is not located at the location.

In Example 34, the subject matter of Example 33 wherein, the verification hierarchy includes a coordination layer, a witness verification layer, and a vehicle sensing layer.

In Example 35, the subject matter of Example 34 wherein, the coordination layer evaluates validity of the location and generates a certificate for handoff to another layer of the verification hierarchy.

In Example 36, the subject matter of Examples 34-35 wherein, the witness verification layer identifies witnesses with sensors that observe the location, evaluates data from the sensors to determine if the user is located at the location, and generates a certificate for handoff to another layer of the verification hierarchy.

In Example 37, the subject matter of Examples 34-36 wherein, the vehicle sensing layer evaluates sensor data from a dispatched vehicle delivering the mobility resource to determine if the user is located at the location and generates a certificate for handoff to another layer of the verification hierarchy.

In Example 38, the subject matter of Examples 27-37 wherein, evaluating the sensor data and user profile data to determine that the request is malicious further comprises evaluating a service flow directed graph to determine mobility resource movement near the location.

In Example 39, the subject matter of Example 38 wherein, the service flow directed graph includes a map of mobility resource routes and mobility resource delivery vehicle movement throughout the map.

Example 40 is at least one machine-readable medium including instructions that, when executed by a machine, cause the machine to perform any method of Examples 27-39.

Example 41 is a system comprising means to perform any method of Examples 27-39.

Example 42 is a system for malicious request deterrence in automated mobility resource dispatch comprising: means for receiving a request for a mobility resource from a user device; means for obtaining a location for delivery of the mobility resource; means for retrieving sensor data for the location; means for evaluating the sensor data and user profile data to determine if the request is malicious; means for generating a disincentivizing message based on the determination that the request is malicious; and in response to receipt of a response to the disincentivizing message, means for dispatching the mobility resource to the location.

In Example 43, the subject matter of Example 42 wherein, the request is received from a mobile device of a user.

In Example 44, the subject matter of Examples 42-43 wherein, the location is obtained from a global positioning system sensor of a mobile device of a user.

In Example 45, the subject matter of Examples 42-44 wherein, the sensor data for the location includes camera data from a camera sensor observing the location.

In Example 46, the subject matter of Examples 42-45 wherein, the sensor data for the location includes sensor data from an autonomous vehicle in the vicinity of the location.

In Example 47, the subject matter of Examples 42-46 wherein, the sensor data for the location includes sensor data from a drone observing the location.

In Example 48, the subject matter of Examples 42-47 includes, the means for evaluating the sensor data and the user profile data further comprising: means for applying verification hierarchy to the sensor data and the user profile data to determine that a user of the user device is not located at the location.

In Example 49, the subject matter of Example 48 wherein, the verification hierarchy includes a coordination layer, a witness verification layer, and a vehicle sensing layer.

In Example 50, the subject matter of Example 49 wherein, the coordination layer evaluates validity of the location and generates a certificate for handoff to another layer of the verification hierarchy.

In Example 51, the subject matter of Examples 49-50 wherein, the witness verification layer identifies witnesses with sensors that observe the location, evaluates data from the sensors to determine if the user is located at the location, and generates a certificate for handoff to another layer of the verification hierarchy.

In Example 52, the subject matter of Examples 49-51 wherein, the vehicle sensing layer evaluates sensor data from a dispatched vehicle delivering the mobility resource to determine if the user is located at the location and generates a certificate for handoff to another layer of the verification hierarchy.

In Example 53, the subject matter of Examples 42-52 wherein, the means for evaluating the sensor data and user profile data to determine that the request is malicious further comprises means for evaluating a service flow directed graph to determine mobility resource movement near the location.

In Example 54, the subject matter of Example 53 wherein, the service flow directed graph includes a map of mobility resource routes and mobility resource delivery vehicle movement throughout the map.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A." and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second." and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for malicious request deterrence in automated mobility resource dispatch comprising:
   at least one processor; and
   memory including instructions that, when executed by the at least one processor, cause the at least one processor to perform operations to:
   receive a request for a mobility resource from a user device;
   obtain a location for delivery of the mobility resource;
   retrieve sensor data for the location;
   evaluate the sensor data and user profile data to determine if the request is malicious;
   generate a disincentivizing message based on the determination that the request is malicious; and
   in response to receipt of a response to the disincentivizing message, dispatch the mobility resource to the location.

2. The system of claim 1, the instructions to evaluate the sensor data and the user profile data further comprising instructions that, when executed by the at least one processor, cause the at least one processor to perform operations to:
   apply verification hierarchy to the sensor data and the user profile data to determine that a user of the user device is not located at the location.

3. The system of claim 2, wherein the verification hierarchy includes a coordination layer, a witness verification layer, and a vehicle sensing layer.

4. The system of claim 3, wherein the coordination layer evaluates validity of the location and generates a certificate for handoff to another layer of the verification hierarchy.

5. The system of claim 3, wherein the witness verification layer identifies witnesses with sensors that observe the location, evaluates data from the sensors to determine if the user is located at the location, and generates a certificate for handoff to another layer of the verification hierarchy.

6. The system of claim 3, wherein the vehicle sensing layer evaluates sensor data from a dispatched vehicle delivering the mobility resource to determine if the user is located at the location and generates a certificate for handoff to another layer of the verification hierarchy.

7. The system of claim 1, wherein the instructions to evaluate the sensor data and user profile data to determine that the request is malicious further comprises instructions that, when executed by the at least one processor, cause the at least one processor to perform operations to evaluate a service flow directed graph to determine mobility resource movement near the location.

8. The system of claim 7, wherein the service flow directed graph includes a map of mobility resource routes and mobility resource delivery vehicle movement throughout the map.

9. At least one non-transitory machine-readable medium including instructions for malicious request deterrence in automated mobility resource dispatch that, when executed by at least one processor, cause the at least one processor to perform operations to:
   receive a request for a mobility resource from a user device;
   obtain a location for delivery of the mobility resource;
   retrieve sensor data for the location;
   evaluate the sensor data and user profile data to determine if the request is malicious;
   generate a disincentivizing message based on the determination that the request is malicious; and
   in response to receipt of a response to the disincentivizing message, dispatch the mobility resource to the location.

10. The at least one non-transitory machine-readable medium of claim 9, the instructions to evaluate the sensor data and the user profile data further comprising instructions that, when executed by the at least one processor, cause the at least one processor to perform operations to:
    apply verification hierarchy to the sensor data and the user profile data to determine that a user of the user device is not located at the location.

11. The at least one non-transitory machine-readable medium of claim 10, wherein the verification hierarchy includes a coordination layer, a witness verification layer, and a vehicle sensing layer.

12. The at least one non-transitory machine-readable medium of claim 11, wherein the coordination layer evaluates validity of the location and generates a certificate for handoff to another layer of the verification hierarchy.

13. The at least one non-transitory machine-readable medium of claim 11, wherein the witness verification layer identifies witnesses with sensors that observe the location, evaluates data from the sensors to determine if the user is located at the location, and generates a certificate for handoff to another layer of the verification hierarchy.

14. The at least one non-transitory machine-readable medium of claim 11, wherein the vehicle sensing layer evaluates sensor data from a dispatched vehicle delivering the mobility resource to determine if the user is located at the location and generates a certificate for handoff to another layer of the verification hierarchy.

15. The at least one non-transitory machine-readable medium of claim 9, wherein the instructions to evaluate the sensor data and user profile data to determine that the request is malicious further comprises instructions that, when executed by the at least one processor, cause the at least one processor to perform operations to evaluate a service flow directed graph to determine mobility resource movement near the location.

16. The at least one non-transitory machine-readable medium of claim 15, wherein the service flow directed graph includes a map of mobility resource routes and mobility resource delivery vehicle movement throughout the map.

17. A system for malicious request deterrence in automated mobility resource dispatch comprising:
    means for receiving a request for a mobility resource from a user device;
    means for obtaining a location for delivery of the mobility resource;
    means for retrieving sensor data for the location;
    means for evaluating the sensor data and user profile data to determine if the request is malicious;
    means for generating a disincentivizing message based on the determination that the request is malicious; and
    in response to receipt of a response to the disincentivizing message, means for dispatching the mobility resource to the location.

18. The system of claim 17, the means for evaluating the sensor data and the user profile data further comprising:
    means for applying verification hierarchy to the sensor data and the user profile data to determine that a user of the user device is not located at the location.

19. The system of claim 18, wherein the verification hierarchy includes a coordination layer, a witness verification layer, and a vehicle sensing layer.

20. The system of claim 19, wherein the coordination layer evaluates validity of the location and generates a certificate for handoff to another layer of the verification hierarchy.

21. The system of claim 19, wherein the witness verification layer identifies witnesses with sensors that observe the location, evaluates data from the sensors to determine if the user is located at the location, and generates a certificate for handoff to another layer of the verification hierarchy.

22. The system of claim 19, wherein the vehicle sensing layer evaluates sensor data from a dispatched vehicle delivering the mobility resource to determine if the user is located at the location and generates a certificate for handoff to another layer of the verification hierarchy.

23. The system of claim 17, wherein the means for evaluating the sensor data and user profile data to determine that the request is malicious further comprises means for evaluating a service flow directed graph to determine mobility resource movement near the location.

24. The system of claim 23, wherein the service flow directed graph includes a map of mobility resource routes and mobility resource delivery vehicle movement throughout the map.

* * * * *